Jan. 31, 1956 F. W. SCHWINN 2,732,618
METHOD OF MAKING TUBE JOINTS
Filed Dec. 2, 1950
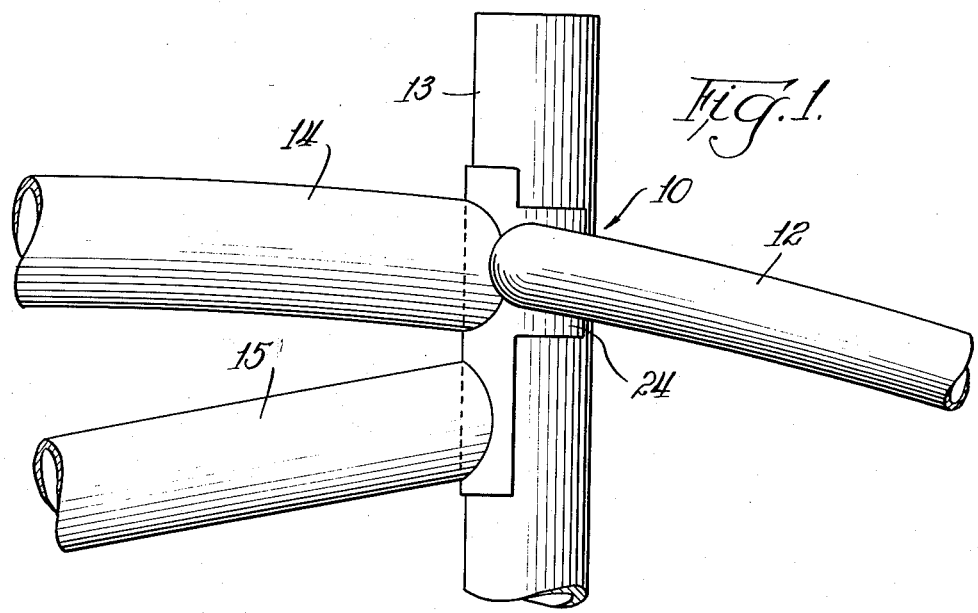
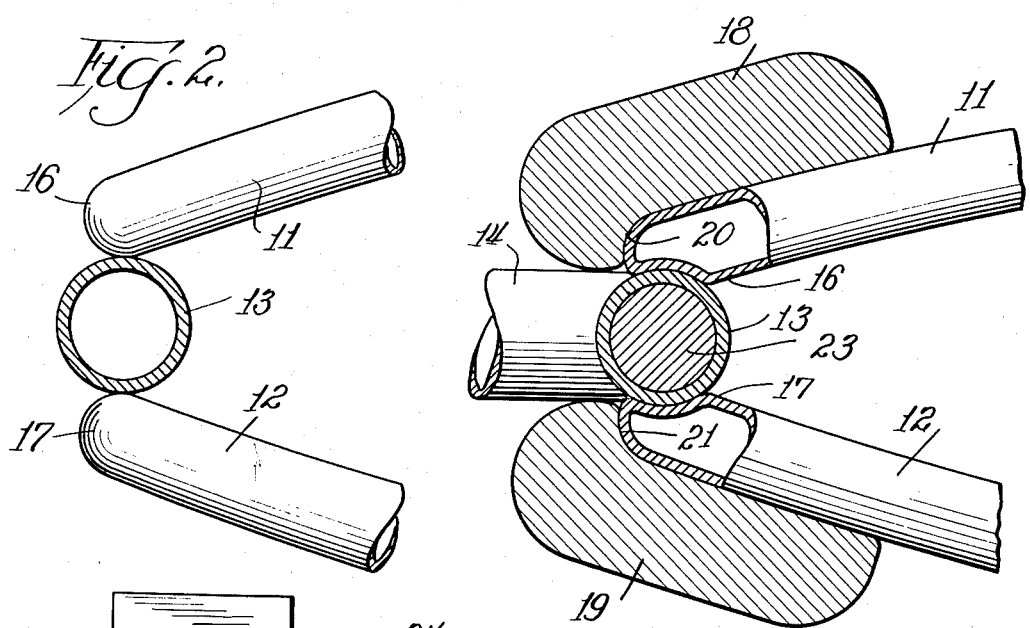
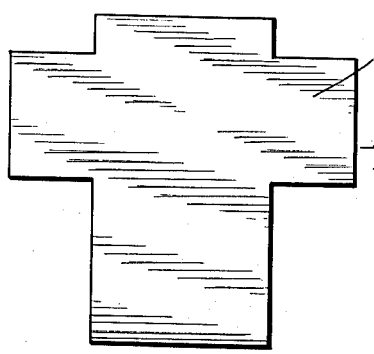
INVENTOR.
Frank W. Schwinn
BY Albert G. McCaleb
Att'y

United States Patent Office 2,732,618
Patented Jan. 31, 1956

2,732,618

METHOD OF MAKING TUBE JOINTS

Frank W. Schwinn, Chicago, Ill.

Application December 2, 1950, Serial No. 198,825

2 Claims. (Cl. 29—482)

This invention relates to a method of making tube joints, and more particularly to such a method which is especially suitable for the joining together of the tubular members utilized in the construction of bicycle frames.

It is an object of the invention to provide a process for making a tube joint in which each of the contacting surfaces of the component tubes of the tube joint is formed with a contour that is exactly complementary to that of the adjacent tube or tubes. This enables the attachment of the tubular members to each other to be secure and rigid, particularly where such attachment is effected by brazing.

A further object of the invention is to provide a method of making a tube joint which is strong and lightweight, and which has a precise and attractive appearance.

It is a more specific object of the invention to produce a tube joint which is particularly adapted for attachment of frame tubes utilized in the manufacture of bicycle frames.

Other objects and advantages of the invention will be apparent from the following description and the accompanying drawings in which similar characters of reference indicate similar parts throughout the several views.

Referring to the one sheet of drawings;

Fig. 1 is a fragmentary side elevational view of a tube joint embodying my invention and showing the component tubes in assembled relationship reparatory to the rigid securement of the tubes to each other;

Fig. 2 is a fragmentary plan view illustrating an assembly of tubes preparatory to forming them into the preferred tube joint contour;

Fig. 3 is a fragmentary plan view, partly in section, showing an assembly of tubes, together with pressure producing means, after the tubes have been conformed under pressure to the requisite tube joint contour; and Fig. 4 is a plan view of a blank of brazing metal adapted to use in the assembly depicted in Fig. 1 for securing the several tubes together with a single heating operation.

In the embodiment of the invention illustrated in the drawings, a tube joint 10 is shown as adapted for use in a portion of a standard bicycle frame. In such a construction, tubes 11 and 12 may be the upper and forward ends of the rear wheel fork brace tubes which extend from the rear axle mounting to the seat mast and main frame of the bicycle. Tube 13 is the seat mast tube of the bicycle frame which extends vertically from a crank hanger (not shown). The brace tubes 11 and 12, spaced from each other to provide the wheel fork, are brought to opposite sides of the seat mast 13 and secured thereto. Additional main supporting members of the bicycle frame are upper reach tube 14 and lower reach tube 15 which extend forwardly from the seat mast tube 13.

One of the advantages resulting from the use of the process embodying the invention is the secure attachment of the rear wheel fork brace tubes 11 and 12 to the seat mast tube 13. Where the brace tubes are secured to the tube 13 by brazing, a good seat is necessary for the contacting surfaces of the component tubes of the joint. As will be hereinafter described in detail, such a seat is provided by conforming under pressure the contacting surfaces of the ends of the brace tubes to the contour of the contacting surfaces of the seat mast tube. The brace tubes 11 and 12 are then rigidly secured to the seat mast tube 13 through the use of a brazing metal, which is interposed and melted in situ between the contacting surfaces of the tubes of the assembly.

In carrying out the process embodying the invention, the brace tubes 11 and 12 are positioned on opposite sides of, and in contact with, the upper end of the seat mast tube as shown in Fig. 2. The brace tubes preferably terminate in rounded and closed end portions 16 and 17 which serve to increase the strength of such ends of the brace tubes and to enhance their appearance. The brace tubes, as they extend from the rear wheel, are separated and curved so that they bear conveniently against opposite sides of the seat mast tube.

To provide a better seat on the seat mast tube 13, the contacting surfaces of the end portions 16 and 17 are conformed under pressure so as to be complementary to the contour of the sides of the seat mast tube. This, in the present instance, is accomplished by pressure clamps 18 and 19 contoured to fit over the end portions 16 and 17 on opposite sides of the brace tubes; the pressure clamps 18 and 19 respectively having rounded recesses 20 and 21 which fit over the rounded ends of the brace tubes 16 and 17. To prevent collapse or deformation of the seat mast tube 13, a pressure-resistant core 23 is inserted into the hollow center of the mast tube. Pressure of a sufficient degree to cause deformation of the inner portions of ends 16 and 17 is then applied against the brace tubes 11 and 12 through pressure clamps 18 and 19. Such deformation is continued until a sufficient area of the contacting surface of each of the brace tubes 11 and 12 is conformed to the exact contour of the sides of the seat mast 13. This provides a good seating contact for later attachment of the brace tubes to the mast, as by brazing.

Upon conforming the end portions 16 and 17 of the brace tubes to the contour of the mast tube, the pressure clamps 18 and 19 are removed. Brace tubes 11 and 12 are then spaced from the seat mast tube 13 a sufficient distance for insertion of a blank 24 of the brazing metal between the brace tubes and the mast tube. The blank 24 is preferably of a shape and size which will cover the front and sides of the upper portion of the seat mast tube 13 so that it will be under not only the brace tubes 11 and 12, but also the upper and lower reach tubes 14 and 15 as these are positioned against the mast tube. The brazing metal of which the blank 24 is formed is a standard brazing metal, such as brazing brass or bronze. A brazing material which has been found to be suitable for securing together the disclosed tube assembly is silver solder blank of a thickness of approximately 0.005 of an inch.

After insertion of the blank 24, the brace tubes 11 and 12 are reassembled against the seat mast tube 13, and upper and lower reach tubes 14 and 15 are placed in abutting relationship against the forward side of the seat mast tube. The brace tubes may be held in place against the seat mast tube by replacing pressure clamps 18 and 19. The tube assembly is rigidly and permanently secured together by melting the brazing metal in situ so that it flows against the contacting surfaces of the tubes and affixes itself thereto. Such melting of the brazing metal is conveniently and effectively carried out by the use of high frequency induction apparatus. After the requisite temperature has been obtained and the brazing metal melted in place, the tube assembly is removed from the apparatus and cooled. The pressure clamps 18 and 19 or other means which may have been utilized in holding the tubes in assembled relationship are then removed.

The cluster joint thus formed needs little, if any, finishing to produce the attractive appearance desirable in bicycle frame construction. The exact fit of the component tubes and the thinness of the sheet of brazing metal used therewith results in a precise and neat appearing joint.

The seating contact of the brace tubes 11 and 12 to the seat mast tube 13 which is effected by the invention is unusually exact and complementary. This is because the seating fit is formed by the actual component parts, so that any deviation in the contour of the seat mast tube from a normal cylindrical shape is compensated for in the contacting surface of the brace tubes. Such exact fitting together of the tubes yields a stronger joint as substantially the entire contacting surface of one tube is in effect in contact with the similar surface of the adjoining tube and contributes in holding the tubes together. Moreover, a thinner sheet of brazing material may be used as there are no cavities or hollow spaces of material size between the contacting surfaces of the component tubes.

It is to be understood in the consideration of this invention that brazing and welding are deemed to be quite equivalent. Any adaptation of my method and apparatus which includes the feature of pressure forming one tube to be exact complementary contour of its adjoining tube as has been described herein in connection with forming a cluster joint in bicycle frame construction is suitable for either a brazing or a welding process.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A process for joining the end of one tube to the side of a cylindrical tube, said process comprising forming a convex surface on the said end of one tube, changing a portion of said convex surface to concave by pressing the convex surface against the side of said cylindrical tube, the curvature of said concave portion conforming to the curvature of the side of the cylindrical tube, and bonding the concave portion of the one tube to the side of the cylindrical tube.

2. A process for joining the end of one tube to the side of a cylindrical tube, said process comprising forming a convex surface on the said end of one tube, changing a portion of said convex surface to concave by pressing the convex surface against the side of said cylindrical tube while controlling the contour of the remaining convex surface during the change of said portion from convex to concave, and then uniting the concave portion with the side of said cylindrical tube.

References Cited in the file of this patent

UNITED STATES PATENTS

| | | |
|---|---|---|
| 1,574,973 | Horvath | Mar. 2, 1926 |
| 1,615,591 | Mallory | Jan. 25, 1927 |
| 1,914,811 | Kraeft | June 20, 1933 |
| 1,951,122 | Balze | Mar. 13, 1934 |
| 2,158,075 | Loftfield | May 16, 1939 |
| 2,387,154 | Kalwitz | Oct. 16, 1945 |
| 2,421,629 | Langos | June 3, 1947 |
| 2,435,294 | Schwinn | Feb. 3, 1948 |
| 2,448,329 | Schwinn | Aug. 21, 1948 |
| 2,448,983 | Johnson | Sept. 7, 1948 |
| 2,495,333 | Kraeft et al. | Jan. 24, 1950 |
| 2,556,987 | Stoudt | June 12, 1951 |